United States Patent [19]
Albright

[11] 3,963,415
[45] June 15, 1976

[54] METHOD AND APPARATUS FOR CONVEYING AND/OR HEATING COAL PARTICLES IN A DENSE PHASE FLOW

[75] Inventor: Charles William Albright, South Charleston, W. Va.

[73] Assignee: Union Carbide Corporation, New York, N.Y.

[22] Filed: Jan. 10, 1975

[21] Appl. No.: 540,220

[52] U.S. Cl. .................................. 432/14; 34/10; 302/66; 432/58
[51] Int. Cl.² ........................................ F27B 15/00
[58] Field of Search .......... 432/14, 58; 34/10, 57 B, 34/57 R; 302/66

[56] References Cited
UNITED STATES PATENTS

| | | | |
|---|---|---|---|
| 1,766,843 | 6/1930 | Soderlund et al. | 34/10 |
| 1,899,397 | 2/1933 | Reiche | 34/10 |
| 2,364,199 | 12/1944 | Derr | 34/57 B |
| 2,621,118 | 12/1952 | Cyr et al. | 34/10 X |

*Primary Examiner*—John J. Camby
*Attorney, Agent, or Firm*—Israel Blum

[57] ABSTRACT

An improvement in a method and apparatus for conveying and/or heating coal particles in a dense phase flow through transfer lines wherein the velocity of the flow through the lines is controlled by a progressive enlargement of line size during indirect heating and/or transfer in the lines thereby minimizing erosion of the transfer lines by the coal particles.

12 Claims, 3 Drawing Figures

METHOD AND APPARATUS FOR CONVEYING AND/OR HEATING COAL PARTICLES IN A DENSE PHASE FLOW

BACKGROUND OF THE INVENTION

1. Field of the Invention

This invention relates to an improvement in a method and apparatus for indirectly heating and/or conveying carbonaceous solid particles in a dense phase flow through transfer lines. More particularly, this invention relates to an improvement in a process for reacting coal particles in coal conversion processes.

2. Description of the Prior Art

Increasing energy needs have focused attention on solid fossil fuels due to their availability in the United States in a relatively abundant supply and their potential value if converted into more useful forms of energy and feedstock. Processes such as carbonization, hydrocarbonization and hydrogasification, wherein synthetic fuel products have been prepared by introducing a fluidized stream of finely-divided coal particles into a reaction zone and reacting the coal particles at elevated temperatures in the presence of inert gases, air, steam, oxygen, hydrogen, or the like, are well known. Fluidizing gases such as air, nitrogen, steam, hydrogen or the like are usually employed.

It is desirable to preheat the coal particles in many of these processes before the particles are reacted with a suitable reagent at elevated temperature in the reaction zone. In the past, coal particles have been directly preheated by means such as contacting the coal particles with large quantities of hot gases. This approach was used since coal particles were conveyed through transfer lines in dilute phase flow in these processes. By "dilute phase" as employed throughout the specification is meant a concentration of solids in fluidizing gas of from about 1 pound to about 2 pounds of solid per cubic foot of gas. Large quantities of hot gases, however, required that costly large diameter lines be employed throughout to accommodate the gases. A serious disadvantage of conveying and heating coal particles in dilute phase flow was that due to the required high velocity in the line which was in the order of more than 75 feet per second, erosion of the line was significant. This erosion made wear plates mandatory in various sections of the line, particularly at bends. Moreover, since it was undesirable to feed the large quantities of hot gases into the reaction zone along with the coal particles, the coal particles were separated from the inert heating gases by suitable equipment such as a cyclone separator.

Indirect heating of a coal-gas mixture flowing through transfer lines in a dilute phase was uneconomical and impractical due to the inherently poor heat transfer coefficients of the transfer lines in dilute phase flow, approximately 1 BTU to 2 BTU per hour per °F per square foot of inside surface area of the transfer line. As a result, indirect heat transfer required the expenditure of much heating energy. For this reason, in coal conversion processes employing a dilute phase flow of coal particles, pheheating steps have generally involved directly contacting the coal particles with hot metal pipes situated in a preheat zone or with large quantities of hot inert gases.

Albright, Holden, Simons, Schmidt, *Chem. Eng.*, 56 103(1951) reported the dense phase transfer of coal particles employing a pneumatic feeder and U.S. Pat. No. 3,337,417 disclosed heating a stream of gas fluidized coal in a dense phase while passing through a tubular heat exchanger immediately prior to carbonization. However, transfer lines on a large scale having a constant diameter throughout would erode rapidly if a dense phase flow of coal particles were to be employed.

SUMMARY OF THE INVENTION

It is an object of this invention to provide an improvement in a method and apparatus for conveying and/or indirectly heating solid carbonaceous particles in a dense phase flow through transfer lines. Another object of this invention is to provide an improvement in a process for reacting coal particles in a carobnization, gasification, hydrocarbonization, hydrogasification or hydrogenation process. Still another object of this invention is to provide a method and apparatus for economically heating coal particles in a dense phase flow while controlling the velocity of the flow through the lines. An object of this invention is to convey coal particles in a dense phase flow through transfer lines while controlling the velocity of the flow through the lines.

This invention is base upon the discovery that in the method and apparatus for transporting a fluidized stream of coal particles in a dense phase, erosion inside the transfer line may be substantially reduced by progressive enlargements, at predetermined intervals, in the size of the line, each line enlargement being a predetermined amount of sufficient to compensate for expansion of the gaseous phase within the line due to increased temperature and/or decreased pressure.

By "dense phase" as used throughout the specification is meant a concentration of solids in fluidizing gas of from about 5 pounds to about 45 pounds of solids per cubic foot of gas and more typically from about 15 pounds to about 40 pounds of solids per cubic foot of gas. Erosion of transfer lines in pneumatic systems generally increases rapidly with increased flow velocity through the lines, typically in the order of the fourth power of the flow velocity. However it has been discovered according to this invention that has the method and apparatus for transporting a fluidized stream of coal particles in a dense phase may be improved by a progressive enlargement of the transfer line size by predetermined amounts at predetermined intervals of transfer line length to regulate the stream velocity below a velocity at which erosion of the transfer line is significant.

Employing the improved method and apparatus of this invention, coal particles in a dense phase flow may be indirectly preheated through a transfer line to a temperature without significant erosion of the line. By "plastic transformation" as used throughout the specification is meant a process wherein surfaces of coal particles being heated, particularly when heated in a hydrogen atmosphere, develop stickiness and transform into substantially solid char, non-sticky surfaces. Plastic transformation is undergone by both normally agglomerating coals and coals which may develop a sticky surface only in a hydrogen-rich atmosphere.

Coal particles begin to become sticky at temperatures in the range of about 350°C to about 500°C, depending on the specific properties of the coal, the atmosphere and the rate of heating. The stickiness results due to a tarry or plastic-like material forming at or near the surface of each coal particle, by a partial melting or decomposition process. On further heating over a time period, the tarry or plastic-like material is further transformed into a substantially porous, solid material referred to as a "char." The length of this time period, generally in the order of minutes, depends upon the actual temperature of heating and is shorter with an increase in temperature.

Employing the improved method and apparatus of this invention, coal particles in a dense phase flow may be indirectly preheated to a temperature between about 250°C and about 420°C, provided that a temperature above about 350°C, the preheat time at that temperature is sufficiently brief to avoid agglomeration of the coal particles. This may be advantageously accomplished by subjecting a dense phase flow of coal particles to an indirect heat transfer means. For example, the coal particles may be heated to the desired temperature by conveying them through a tubular heat exchanger wherein the size of the tubes or lines through which the stream of coal particles flow is progressively enlarged at predetermined section lengths of uniform cross-sectional area. This regulates the flow rate of the dense phase below a predetermined stream velocity at which erosion of the lines is significant.

The indirect heating of a flow of coal particles in dense phase according to this invention provides the following benefits: The quantity of coal particles transferred and heated per unit of transfer line cross-sectional area not only greatly exceeds that obtainable in dilute phase flow but also uses less power. A cubic foot of gas conveys 15 to 30 times more coal particles in dense phase flow than in dilute phase flow. The use of a comparatively small amount of conveying gas in dense phase flow may be extremely beneficial downstream, if, for example, flue gas or nitrogen gases from a coal conversion process such as hydrocarbonization is used as the conveying gas. Large amounts of conveying gas other than hydrogen-rich gas or recycle gas are undersirable in a fluid-bed hydrocarbonization zone and must be separated from the coal particles before entering the reaction zone by suitable equipment such as a cyclone separator or the like.

Moreover, if such a separation is desired, in dense phase, the coal particles are more easily separated from the conveying gas before entering a fluid-bed reaction zone such as a hydrocarbonization zone. Also, power requirements are intrinsically smaller in dense phase flow, due to lower carrier gas velocities. In dilute phase flow, the linear velocity of carrier gas is generally between 50 and 100 feet per second to prevent entrained coal particles from settling out in the transfer lines. However, in dense phases flow, the linear velocity of carrier gases may be as low as about 15 feet per second and maintain steady flow in the transfer lines.

The velocity of a stream of fluidized coal particles in a dense phase flow through a line of constant diameter or cross-sectional area increases in accordaance with an expansion of the fluidizig gas. Expansion of the gas within the line results from a pressure drop and/or an increase in temperature of the flowing stream in the line. There is a continuous loss of pressure at ambient temperature for a given length of line when a fluidized stream of coal particles in a dense phase is transported through the line. An increase in temperature in the line such as occurs during heating the fluidized stream of coal particles in one aspect of the improved method of this invention further expands the gas and increases the velocity in the line, but the influence of the pressure drop on the velocity in the line is generally more significant.

It has been found that by employing the overall pressure drop method, using a modified Fanning Equation for steady flow in uniform circular pipes running full of water under isothermal conditions as described in Perry'*Chemical Engineers' Handbook*, 3rd Edition, 1950 at pages 377 and 382, in conjunction with an empirically derived equation applicable to the dense phase transport of coal particles, the pressure drop for the transfer of a dense phase flow of coal particles through a line of predetermined length can be calculated and hence the velocity to which the dense phase is accelerated may be calculated. Conversely, when employing the above mentioned empirical equation and given an end velocity, the length of line which is required to reach this velocity may be calculated.

The velocity of the fluidized stream of coal particles being transported through at least one transfer line is regulated so that erosion of the transfer line is minimized. It has been found that a stream velocity below about 60 feet per second should be maintained and a velocity between about 15 feet per second and about 60 feet per second is preferred. A dense phase flow of coal particles at a stream velocity above about 60 feet per second throughout the transfer line would have required wear plates to be installed throughout the transfer lines to control the otherwise rapid erosion rate of the line, such wear plates being an undersirable expense.

However, according to the method and apparatus for the present invention, at lease one transfer line is employed, the line comprising at least a plurality and preferablly a multiplicity of successively linked and serially aligned sections, each section having a uniform cross-sectional areas. Moreover, the diameter or cross-sectional area of each succeeding section is progressively enlarged a predetermined amount. The velocity of the fluidized stream of coal particles entering each section of uniform cross-sectional area is lowered to a predetermined entrance velocity. The length of each section of uniform cross-sectional area is selected so that the fluidized stream of coal particles exits each section at a predetermined exit velocity.

The second predetermined velocity is greater than said first predetermined velocity and below a stream velocity at which erosion of the line is significant. It is preferable that the predetermined entrance velocity be between about 15 feet per second and about 50 feet per second and the predetermined exit velocity be between about 50 feet per second and about 60 feet per second. More preferably, the predetermined entrance velocity is between about 15 feet per second and about 20 feet per second and the predetermined exit velocity is between about 50 feet per second and about 60 feet per second. Most preferably, the predetermined entrance velocity is about 20 feet per second and the predetermined exit velocity is about 60 feet per second. By employing these velocities, erosion of the transfer line is minimized.

The successively linked and serially aligned sections which comprise the transfer line employed in this invention are separated by transition sections. Each transition section has a varying cross-sectional area which is linearly enlarged a predetermined amount. Such an enlargement in cross-sectional area operates to lower the velocity at which the stream of coal particles enters the transition section to a predetermined velocity at which the stream leaves the transition section. Since the transition section is interposed between two sections of uniform cross-sectional area, the stream of coal particles leaves one section of uniform cross-sectional area linked to the transition section and enters the transition section at the predetermined exit velocity. Furthermore, the stream of coal particles leaves the transition section and enters the other section of uniform cross-section area linked to that transition section at the predetermined entrance velocity. The varying cross-sectional area of the transition section is enlarged a predetermined amount sufficient to lower the predetermined exit velocity to the predetermined entrance velocity. In this manner, the stream of coal particles enters each section of successively larger uniform cross-sectional area at the predetermined entrance velocity.

In the transport of a dense phase stream of coal particles through at least one transfer line, the present invention, each of the transition sections, interposed between successively linked sections of progressively enlarged uniform cross-sectional area, lowers the velocity of the stream of coal particles leaving each section of uniform cross-sectional area from a predetermined exit velocity to a predetermined entrance velocity. This is accomplished by enlarging the cross-sectional area of the line a predetermined amount. It has further been found in accordance with the present invention, that the length of each successive section of transfer line having a progressively enlarged uniform cross-sectional area my be selected, when temperature and pressure differentials are encountered, in accordance with the following empirically derived equation:

$$\Delta P/L = 0.629 \, D^{0.5} \, G^{1.85}$$

wherein $\Delta P/L$ is the pressure drop per foot of transfer line in psi per foot; $D$ is the inside diameter of the transfer line measured in feet and $G$ is the mass velocity measured in million pounds per hour per square foot.

By using this equation in conjunction with the approximate overall pressure drop method which provides an approximte starting point for calculations, the pressure drop in a section of transfer line having a uniform cross-sectional area may be calculated. It has been found that the pressure drop encountered in the heating and transfer of coal particles in a dense phase was related to the ambient temperature transfer of water by a constant 1.4 factor. For example, by using the Fanning equation as mentioned hereinabove, one can easily calculate the pressure drop for transferring an equivalent weight of water. Then, by multiplying this pressure drop by the factor 1.4, the approximate pressure drop for the transfer of an equivalent weight of dense phase coal particles is determined. Employing the overall pressure drop method and the equation empirically derived as described hereinabove, the length of transfer line of a predetermined uniform cross-sectional area required to regulate the exit velocity of a stream of coal particles in a dense phase through the transfer line can be calculated. It should be understood that it is convenient to employ the overall approximate pressure drop method in conjunction with the empirically derived equation of this invention to facilitate rapid calculations, but it is not essential.

It has been discovered that an increase in the temperature during heat transfer to the flowing stream of dense phase coal in the transfer line has negligible effect upon the pressure drop through a given length of line. However, the expansion of the conveying gas, due to the increased temperature, has a large effect upon the stream velocity in the line. Hence, under conditions of heating, preferably indirect heating of the dense phase stream of coal particles to a desired temperature, the length of each section of progressively larger uniform cross-sectional area or diameter is generally smaller than the length would be in dense phase transport of the coal particles at ambient temperature. This requires transition sections at shorter intervals to control the stream velocity.

Hence, under conditions of heat transfer, the length of each successively linked section of progressively larger, uniform cross-sectional area or diameter which is required to prevent the stream velocity through each such section from exceeding a predetermined exit velocity involves calculations which take into account both the pressure drop in the line and the increased temperature of the stream of coal particles. The increase in volume of the conveying gas due to the rise in temperature of the flowing stream must be calculated and superimposed on the increase in conveying gas volume due to the pressure drop in the line. This expansion of the conveying gas in the flowing stream due to a temperature rise is calculated by applying well-known principles of heat transfer.

It has been found that the heat transfer coefficient for the flowing dense phase coal stream, $h_c$, is a constant at about 34 BTU/hr/ft²/°F, based upon the inside surface area of the transfer line. Therefore, the overall heat transfer coefficeint, U, (expresssed in units of BTU/hr/ft²/°F), can be calculated based upon well-known principles of heat transfer described, for example, in Perry's *Chemical Engineers' Handbook*, 3rd Edition, 1950 at page 465 et seq., regardless of the heating medium on the outside of the transfer line or the materials comprising the transfer line.

For example, the relationship $$\frac{1}{U} = \frac{1}{h_a + h_r{}^g + h_r{}^m} + \frac{1}{h_c}$$

may be employed in calculating the expansion of the conveying gas due to a temperature rise, the values for the variable depending, in part, on the type line and heating medium employed, wherein:

$U$ = Overall heat transfer coefficient, B.t.u. per hour per square foot per °F.

$h_a$ = Gas film coefficient, B.t.u. per hour per square foot per °F.

$h_r{}^g$ = Radiation coefficient gas to line, B.t.u. per hour per square foot per °F.

$h_r{}^m$ = Radiation coefficient shell to line, B.t.u. per hour per square foot per °F.

$h_c$ = Coal film coefficient, B.t.u. per hour per square foot per °F.

In many cases, the principal resistance to heat transfer is $h_c$. Hence, in such cases, other resistances may be neglected and $h_c$ employed in claculating the heat transfer.

According to this invention, a dense phase flow of coal particles is heated by indirect transfer means to a temperature below the minimum temperature for softening or significant reaction range, in the substantial absence of oxygen. For example, a dense phase of coal particles may flow through at least one transfer line, preferably through a plurality and more preferably through a multiplicity of parallel transfer lines which are externally heated. The inside heat transfer coefficient of each transfer line has been found to approximate that found in heat transfer through the walls of a fluid-bed, about 20 to about 40 BTU per hour per square foot of inside surface area per °F. The externally heated transfer lines through which the coal particles pass should be heated to a predetermined temperature sufficient to raise the temperature of the dense phase of coal particles to between about 250°c and about 420°C upon exiting the externally heated transfer lines.

Preheating is desirable in many coal conversion processes. For example, in a hydrocarbonization process, the object of preheating the coal particles is to satisfy partially the enthalpy demand of the hydrocarbonization reaction. Additional heat is supplied by the heat required to raise the temperature of coal and process gas from their initial value to reaction temperature plus small heat losses. The actual temperature to which the coal feed should be preheated is, therefore, a function of the preheat added to process, and in the extreme may be ambinet temperature, i.e. zero preheat.

These and other benefits will become clearer from the description of the invention in detail in connection with the accompanying drawings.

According to the method of this invention, feed coal is in pulverized form, having been crushed, ground, pulverized or the like to a size finer than about 8 Tyler mesh and preferably finer than about 20 Tyler mesh. Furthermore, while the feed coal may contain absorbed water, it is preferably free of surface moisture. Coal particles meeting these conditions are herein referred to as "fluidizable." Any such absorbed water will be vaporized during preheat. Moreover, any such absorbed water must be included as part of the inert carrying gas and must not be in such large quantities as to give more carrying gas than required.

Figure 1:
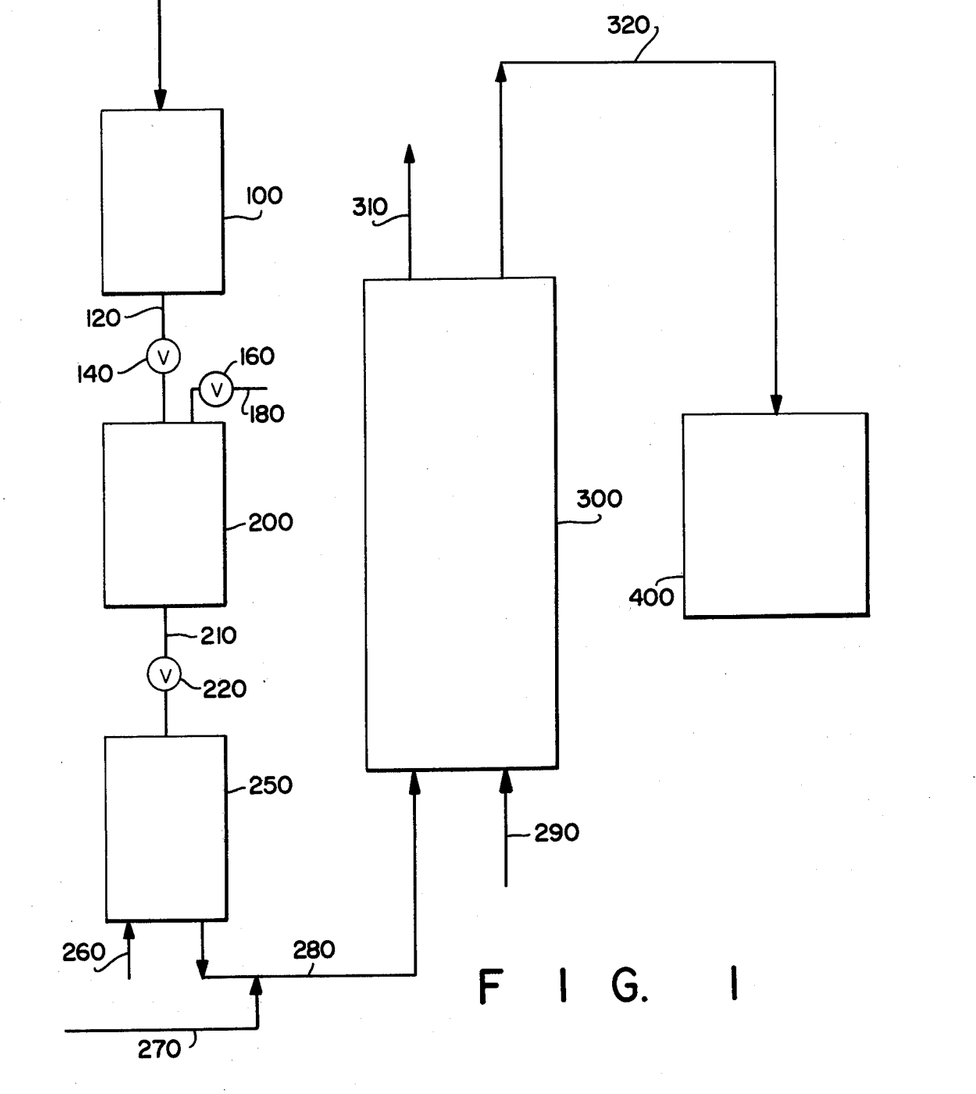
FIG. 1 represents a semi-diagrammatic view of an arrangement of apparatus suitable for carrying out the method of this invention.

Coal supply vessels 100 and 200 each can hold a bed of fluidizable size coal particles, which are employed in the process. Coal supply vessel 100 is typically a lock-hopper at essentially atmospheric pressure. Coal supply vessel 200 is typically a lock-hopper in which fluidized coal can be pressurized with process gas or other desired fluidization gases.

Operations of vessels, 100, 200 and 250 can be illustrated by describing a typical cycle. With valves 160 and 220 closed, lock-hopper 200 is filled to a predetermined depth with coal from lock-hopper 100 through open valve 140 and line 120 at essentially atmospheric pressure. Then, with valves 140 and 220 closed, lock-hopper 200 is pressurized to a predetermined pressure above reaction system pressure through open valve 160 and line 180. Valves 140 and 160 are then closed and coal is introduced into fluidized feeder vessel 250 through open valve 220 and line 210. The cycle about lock-hopper 200 is then repeated. A typical time for such a cycle is from about 10 to 30 minutes. With valve 220 closed, fluidized coal is fed at a predetermined rate through line 280 to the downstream process units.

Other variations to the feeding cycle to the fluidized feeder are possible, of course, but they are not illustrated herein since they do not form the inventive steps of the process. For example, a solids pump, such as described in U.S. Pat. No. 3,400,985 may be substituted for the lock-hopper. Using a solids pump, the coal may be pressurized with a suitable carrying gas such as recycle gas from a reaction zone or make-up hydrogen and fed intermittently to a pressure vessel such as fluidized feeder 250.

In fluidized feeder 250, a fluidizing gas passes through line 260, at a low velocity sufficient to entrain the fluidizable coal and convey it in dense phase flow through line 280 and into the bottom of coal preheater 300, or directly to line 320 if no preheat is desired. Alternately, additional gas could be added through line 270 to line 280 to assist in conveying the coal dense phase flow. Any non-oxidizing gas may be used as the fluidizing gas, e.g. fuel gas, nitrogen, hydrogen, steam or the like. However it is preferable in general to use a reaction process or recycle product gas from a coal conversion process.

Coal preheater 300 is a means to rapidly preheat when desirable the finely divided coal particles, under fluidized conditions, to a temperature below the minimum temperature for softening or significant reaction range, in the substantial absence of oxygen. The maximum allowable temperature for heating is in the range of about 300°C to about 420°C. The stream of gas fluidized coal in dense phase is heated upon passing rapidly through the heater having a favorable ratio of heating surface to internal volume. The coal is heated in heater 300 to the desired temperature by any convenient means of indirect heat exchange, e.g., by means of radiant heat or a hot flue gas such as depicted in FIG. 1 as entering the bottom of heater 300 through line 290 and exiting the top of the heater 300 through line 310.

The temperature to which the coal may be preheated is related to the amount of sensible heat which must be added so that a reactor employed in a coal conversion process can run adiabatically. On the high side, it is limited by the temperature at which the coal begins to soften and become sticky or the temperature at which significant volatilization takes place. This depends on the properties of the particular coal feed, but generally an upper limit of between about 300°C and about 420°C may be expected.

Upon exiting the preheater 300 through line 320 the dense phase coal paraticles are depicted as passing into vessel 400. It is preferable, in general, that the coal particles be conveyed directly into a reaction zone in a coal conversion process so vessel 400 may represent a reactor vessel or a lock-hopper employed for intermediate storage before reaction in the reaction zone of a coal conversion reactor (not shown).

Figure 2:
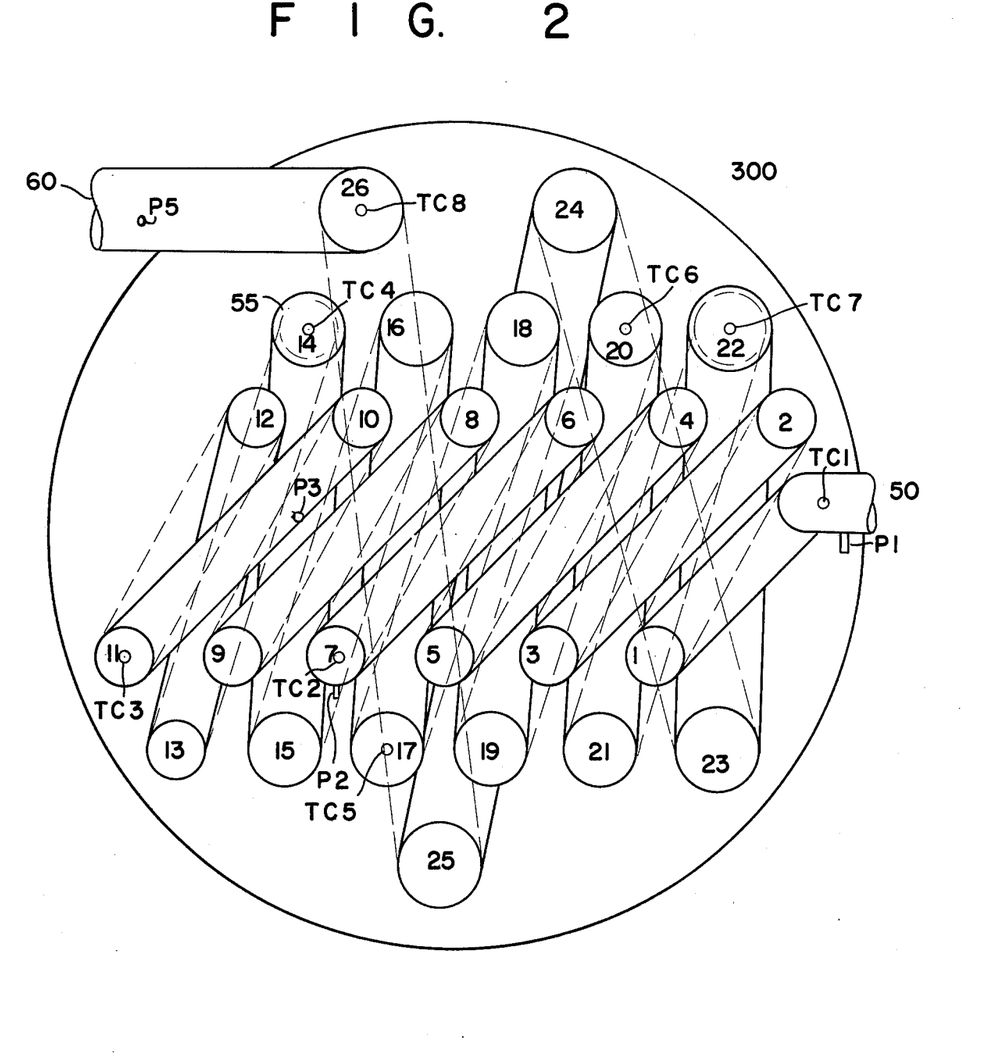
FIG. 2 represents an end sectional view of a preheater 300 suitable for carrying out the method of this invention.

In FIG. 2, coal particles in a dense phase flow enter the tubular heat exchanger 300 at entrance 50 through line section 1 which is a long straight length of uniform cross-sectional area or diameter. From line section 1, the stream of coal particles flow through line sections 2–13 in succession, each section of line having an equivalent and uniform diameter or size and approximately equivalent length. Long or preferably extra long radius bends are used for the 180°return bends so that flow through the bends is essentially equivalent to that in a straight length of line. This minimizes erosion of the line.

From line section 13, the coal particles pass through transition section 55 into line section 14 whose diameter is larger than that of line sections 1–13. The stream of coal particles is conveyed through line sections 14–21 in succession, each of these line sections having approximately equivalent lengths and equivalent and uniform size diameters. Long or preferably extra long radius bends are employed for the 180° bends in the same manner as described hereinabove for line sections 1–13. Line section 13 is connected to larger size line section 14 via a transition line section 55 whose diameter gradually enlarges linearly to the size of line section 14. It is desirable, in general, to expand to at least one line size greater than the previous size employed when expanding the line size according to this invention.

From line section 21, the stream of coal particles in a dense phase flow passes through transition line section 56 into line section 22 whose diameter is larger than that of line sections 14–21. The stream of coal particles is conveyed through line sections 22–26 in succession and leave the heat exchanger 300 through line 26 at exit 60. Lines 22–26 have equivalent and uniform size diameters and are shown as varying in length.

As the stream of coal particles flow through the line sections 1–26 which are being externally heated, the dense phase is preheated to the desired temperature range. Although only three enlargements in the line size are depicted, a plurality of line size enlargements may be desirable, and a multiplicity of line size enlargements preferred. Moreover, although only one line is illustrated, the scope of this invention includes the use of a plurality or multiplicity of such lines, each line being successively expanded at intervals as illustrated in FIG. 2.

Each transfer line comprises a plurality of successively linked and serially aligned sections, 1–13, 14–21 and 22–26, each of these three sections having a uniform cross-sectional area or diameter as illustrated in FIG. 2. These three sections having a uniform cross-sectional area are separated by transition sections 55 and 56, each having a varying diameter which is linearly enlarged a predetermined amount in cross-sectional area. A length for each successive section of uniform cross-sectional area is selected so that the stream of coal particles being heated leaves each successive section at a predetermined exit velocity which is below the velocity at which significant erosion occurs. Each transition section lowers this predetermined exit velocity to a predetermined entrance velocity for each succeeding section of uniform cross-sectional area linked thereto.

Therefore, the length of the first section of uniform cross-sectional area, illustrated as 1–13 in FIG. 2 should be sufficient to control the stream velocity of coal particles being heated below a predetermined exit velocity. As the stream passes through transition section 55, the predetermined exit velocity is lowered to the predetermined entrance velocity and enters the second section of uniform cross-sectional area, 14–21, having a larger cross-sectional area than the first section, 1–13.

The second section of uniform cross-sectional area should have a length sufficient to maintain the stream velocity below the predetermined exit velocity at which the stream of coal particles leaves the second section and enters transition section 56. Transition section 56 operates to lower the predetermined exit velocity of the coal particle stream to the predetermined entrance velocity at which the stream enters the third section, 22–26. The third section illustrated in FIG. 2 has a uniform cross-sectional area which is larger than the cross-section area of second section of transfer line.

The temperature to which the stream of coal particles is heated in each section of transfer line is separately calculated since it depends, in part, on the surface area available for heat transfer. The sum of the additions of the separate calculations should reach the desired preheat temperature of between about 280°C and about 480°C. The length of the third line section of uniform cross-sectional area being heated, 22–26, may not have to be the maximum length possible to still regulate the stream velocity below the predetermined exit velocity. When the desired end preheat temperature is reached, the length of line being heated may be shorter than that allowable before the stream reaches the predetermined exit velocity since if a longer length of line were heated, the coal particle stream would overheat. Hence, the total length of transfer line required to preheat the stream of coal particles to a desired end temperature may be predetermined as well as the number of line size enlargements and lengths of each line section of progressively enlarged, uniform cross-sectional area.

It should also be apparent that the progressive enlargement of line size as a stream of coal particles flows through the line illustrated in a heat exchanger also illustrates the type of line size enlargement employed in this invention in the general dense phase transport of coal when pressure drops through the line raises the stream velocity to a level where erosion of the line would become significant. Moreover, when transporting coal particles in a dense phase flow, in general, it may be desirable to employ a plurality or even multiplicity of separate lines. Each line should be progressively expanded in the manner described hereinabove in accordance with the method of this invention to avoid significant erosion of the line.

The particular material comprising the transfer line employed in this invention which handles a fluidized stream of coal particles in a dense phase is not critical. Metals and non-metallics having thermal conductivity and operable at the temperatures employed are preferable, but other materials such as ceramics may be employed but if non-conducting, they would influence the overall heat transfer coefficient.

Figure 3:
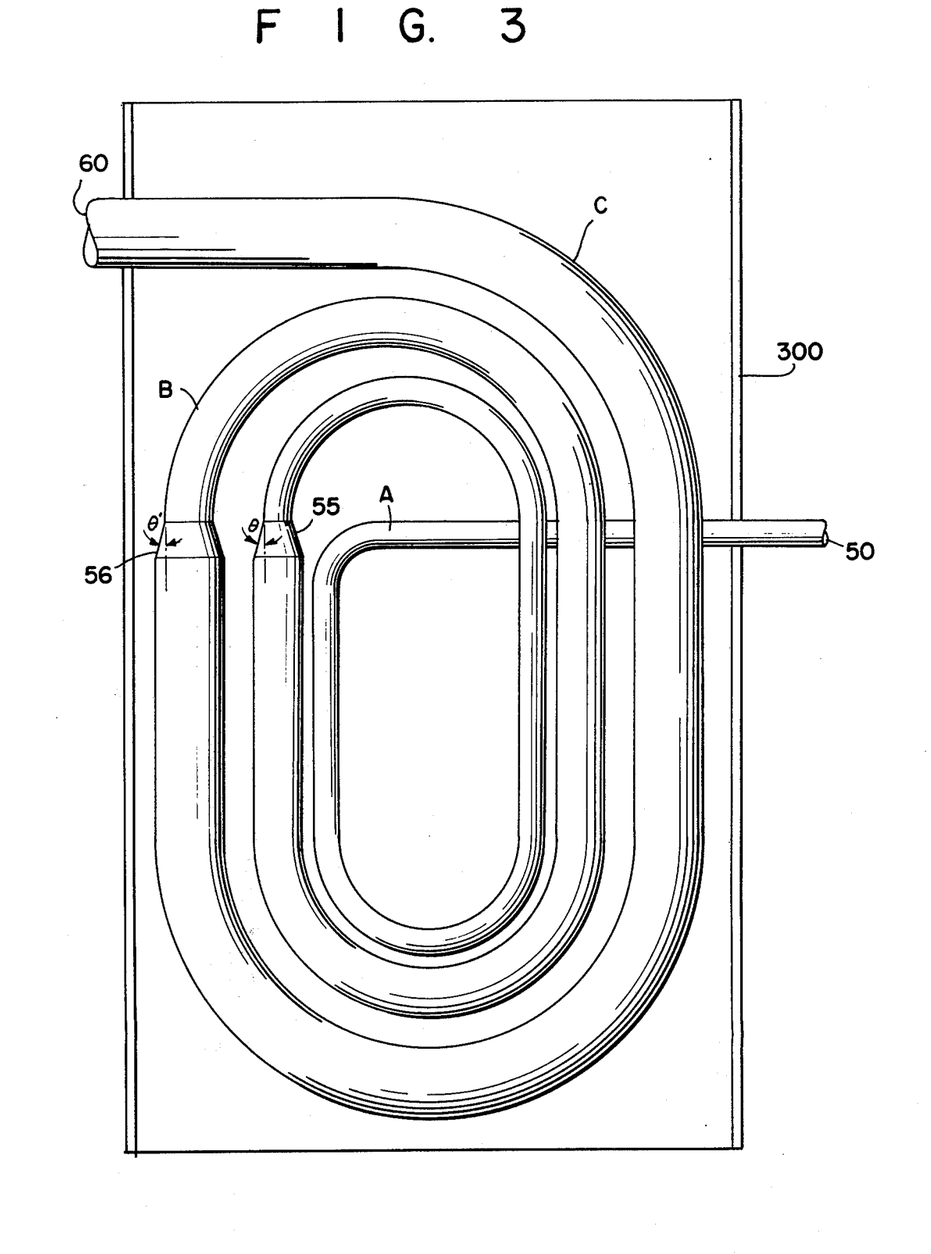
FIG. 3 represents a side sectional view in schematic form of the preheater 300 illustrated in FIG. 2.

FIG. 3 illustrates transition section 55 and 56 interposed between line sections A and B and B and C, respectively. In FIG. 3, coal particles in a dense phase flow enter the tubular heat exchanger 300 at entrance 50 through line section A having a uniform cross-sectional area and corresponding to line sections 1–13 of FIG. 2. From line section A, the stream of coal particles passes through transition section 55 into line section B having a diameter which is larger than that of line section A. The cross-sectional area or diameter of transition line section 55 is illustrated as linearly enlarged from the size of line section A a predetermined amount to the increased size of line section B. The slope of the linear enlargement is illustrated as $\theta$, an angle of 22°. A slope between about 7° and about 30° may be selected to minimize erosion and pressure drop in the line, preferably between about 7° and about 15°, and more preferably between about 7° and about 10°.

From line section B which corresponds to line sections 14–21 of FIG. 2, the coal particles stream in a dense phase flow passes through transition line section 56 into line section C whose diameter is larger than that of line section B. Line section C corresponds to line sections 22–26 of FIG. 2. The cross-sectional area or diameter of transition section 56 is illustrated as linearly enlarged from the size of line section B a predetermined amount to the increased size of line section C. The slope of the linear enlargement is also illustrated as $\theta$, an angle of 22°. A slope for the linear enlargement so that $\theta$ is between about 7° and about 30° may be employed to minimize erosion and pressure drop in the line. Preferably, a slope so that $\theta$ is between about 7° and about 15° and more preferably a slope so that $\theta$ is between about 7° and about 10° is employed. The stream of coal particles is conveyed through line section C and leaves the heater 300 through line C at exit 60.

A length for each of the successive sections of uniform cross-sectional area A, B and C respectively, is selected so that the stream of coal particles being heated leaves each successive section at a predetermined exit velocity, as defined herein. Each transition section, 55 and 56, lowers this predetermined exit velocity to a predetermined entrance velocity, as defined herein, for each succeeding section of uniform cross-sectional area linked thereto.

EXAMPLE

The apparatus employed for this example consisted of the following major units: (1) a fluidized feeder (depicted as 200 in FIG. 1), (2) a gas furnace, (3) a heat exchanger (depicted as 300 in FIGS. 1, 2 and 3), (4) a hot coal receiver (depicted as 400 in FIG. 1), (5) a weighing bin and (6) a Westinghouse Air-Brake Compressor. The fluidized feeder was a four-ton capacity storage tank mounted upon a Baldwin 0–20,000 pound strain gauge load cell for weighing of the vessel and contents. The gas furnace was equipped with three No. 57A Surface Combustion burners (manufactured by Surface Combustion Corp., Toledo, Ohio) to furnish a natural draft stack 14-inches outside diameter and 25 feet tall. The heat exchange coil consisted of fourteen 20-feet sections of ½-inch Schedule 80 pipe, eight sections of ¾ inch Schedule 80 pipe and four sections of 1-inch Schedule 80 pipe. Using 180° return bends, the individual sections of pipe were welded into one continuous coil starting with the ½-inch pipe. In FIG. 2, line sections 1–13 may be considered to correspond to the ½-inch pipe, line sections 14–21 to the ¾-inch pipe and line sections 22–26 to the 1-inch pipe of this example. The coil was provided with seven thermocouple wells illustrated as T.C. 1–7, respectively in FIG. 2 and five pressure taps for the measurement of entrance, exit, and intermediate temperatures and pressures illustrated as P1–P5 in FIG. 2.

The hot coal receiver such as vessel 400 of FIG. 1 consisted of a three ton capacity coal storage tank designed to operate as a low pressure feeder for the return of the coal to the fluidized feeder. The weighing bin consisted of a tank mounted on a 3,000-pound scale used for periodic checking of the load cell calibration. The Westinghouse Air-Brake Compressor was used to furnish nitrogen at 160 pounds per square inch gauge for the operation of the feeder. The auxiliary equipment for the nitrogen system consisted of a suction pot, an oil filter and a surge tank.

Employing the apparatus described hereinabove, one of two sizes of coal which had been preliminarily dried and pulverized so that either 100 percent passed 20 mesh or 100 percent passed 40 mesh and fed from the fluidized feeder into the heat exchanger 300. From the heat exchanger 300, the coal particles were fed into the hot coal receiver 400 for recycling to the fluidized feeder.

A series of 12 runs was made employing the above-identified equipment. In these runs, the feeder tank was kept at a fixed pressure of 140 pounds per square inch gauge with the receiver at atmosphere pressure.

Before starting the coal flow, the heat exchanger was preheated to a temperature at the flue gas inlet not exceeding 450°C in order to avoid pluggings of the coil by coking. After initiating the coal flow, the inlet flue gas temperature was rapidly raised to the desired point.

After equilibrium conditions were reached, the run was started. Static pressures in the coil were measured at the points in the coil designated as P1, P2, P3, P4 and P5 in FIG. 2 and temperatures at points in the coil designated at T.C 1–6 respectively in FIG. 2. The inlet and outlet flue gas temperatures were measured by taking a probe at numerous points with a bare thermocouple across the cross-section of the stack below and above the coil. The coal feed rate was measured by weighing the tank with the load cell at the start and end of each run. The natural gas burned and carbon dioxide added to the flue gas were measured by orifices. Carbon dioxide was added to increase the accuracy of the flue gas analysis. Samples of flue gas were taken near the start and end of each run. Coal samples were taken prior to the start and after the end of each run.

The amount of gas conveying the coal was measured indirectly by measuring with orifices the quantities of gas entering the feeder and venting from the top. The duration of the runs was approximately 1 hour.

The pressure and velocity profile along the heating coil for run 12 is summarized in Table III. The pressure drop profile for the ½-inch pipe section of the heating coil indicates a linear dependence of pressure drop upon length of pipe. The minimum velocity encountered in the heating runs was 20 feet per second at the entrance to the coil in run 1. The maximum velocity was 160 feet per second at the exit of the coil in run 8. If the coil has not been progressively enlarged from a ½-inch pipe to a 1-inch pipe, the maximum velocity at the outlet in run 1 would have been 490 feet per second due to the expansion of the conveying gas. This illustrates the method of this invention employing a progressive enlargement of the pipe size when pressure and temperature differentials are encountered.

The data in Table IV indicates that the temperature level has little effect on the coal transfer rate at constant pressure drop. Hence, the temperature level has little effect on the pressure drop at a constant coal transfer rate.

When a heat transfer medium such as sodium is employed, the metal walls of the coils and the coal film are controlling and the over-all heat transfer coefficient is readily calculable. When high-temperature flue gas is used as the heating medium, a radiation heat transfer coefficient should be calculated to be added to the flue gas film coefficient. A method used for the calculation of the radiation coefficient is shown in Table V. Convection gas coefficient encountered in the present example was between 3 and 4 B.t.u. per hour per square foot per °F due to low allowable natural draft pressure drop. This coefficient may be readily increased by suitable means such as baffling. Also, the effective heat transfer area may be increased by the use of finned tubes, if desired.

Data from the runs are summarized in Tables I, II, III, IV, V, VI, VII and VIII as follows:

Table I

Overall Heat Transfer Coefficient

| Run* No. | U** BTU/hr/ft²/°F | Temperature °F In Gas | Out gas | In Coal | Out Coal |
|---|---|---|---|---|---|
| 1 | 7.27 | 1045 | 441 | 100 | 365 |
| 2 | 6.53 | 1047 | 435 | 86 | 367 |
| 3 | 6.35 | 1186 | 496 | 108 | 439 |
| 4 | 7.68 | 1197 | 516 | 118 | 471 |
| 5 | 7.08 | 1342 | 547 | 118 | 513 |
| 6 | 5.83 | 1402 | 540 | 117 | 505 |
| 7 | 7.85 | 1387 | 606 | 207 | 563 |
| 8 | 9.72 | 1609 | 680 | 183 | 673 |
| 9 | 11.20 | 1548 | 666 | 196 | 649 |
| 10 | 9.06 | 1686 | 651 | 142 | 640 |
| 11 | 9.68 | 1643 | 687 | 243 | 684 |
| 12 | 10.62 | 1546 | 682 | 189 | 687 |

*Runs 1, 3, 6, 7, 10–12 — 100 per cent through 40 mesh. Runs 2, 4, 5, 8 and 9 — 100 per cent through 20 mesh.
**The heat transfer coefficient for the inside coal film for the 12 experiments was found to be a constant, i.e., $h_c = 34$ Btu/hr/ft²/°F. This coefficient is close to that encountered in heat transfer to a fluidized bed.

TABLE II

Sectional Over-all Heat Transfer Coefficients For Run 12

| Pipe Size X-Heavy | Inside Surface Area, Sq. Ft. | Emperical C' Btu/Lb/°F | q* Btu/Hr | Δt Coal °F | U Btu/Hr/Ft²/°F |
|---|---|---|---|---|---|
| ½ | 18.09 | 0.372 | 135,400 | 153 | 9.39** |
| ½ | 11.87 | 0.428 | 73,600 | 77.4 | 9.43 |
| ½ | 11.87 | 0.467 | 83,800 | 81.0 | 12.44 |
| ¾ | 8.35 | 0.494 | 31,500 | 28.8 | 7.77 |
| ¾ | 16.12 | 0.516 | 69,800 | 61.2 | 9.87 |
| ¾ | 8.16 | 0.538 | 34,300 | 28.8 | 11.61 |
| 1 | 21.29 | 0.562 | 84,800 | 68.4 | 13.06 |
| | | | Accumulative Average | | 10.71 |

*Corrected for heat into conveying gas and water.
**Assumed latent heat to 7.5 lb. water in this section coal rate = 2162 lb./hr.

TABLE III

Pressure and Velocity Profile for Run 12

| Between Pressure Points | Line Size, Inches X-Heavy | Straight Length, Feet | Number Bends | ΔP Total Psi | ΔP/Ft. Psi/Ft. | Average Velocity, Ft/Sec |
|---|---|---|---|---|---|---|
| 1 – 2 | ½ | 121 | 7 | 38 | 0.314 | 34.4 |
| 2 – 3 | ½ | 160 | 7 | 52 | 0.326 | 48.8 |
| 3 – 4 | ¾ | 160 | 7½ | 27 | 0.169 | 78.5 |
| 4 – 5 | 1 | 80 | 4½ | 12 | 0.150 | 92.6 |

| Between Temperature Points | | Equivalent Straight Length, Feet | | | | |
|---|---|---|---|---|---|---|
| 1 – 2 | ½ | 126.5 | — | — | — | 34.4 |
| 2 – 3 | ½ | 83 | — | — | — | 54.1 |
| 3 – 4 | ½ | 83 | — | — | — | 81.5 |
| 4 – 5 | ¾ | 43 | — | — | — | 59.3 |
| 5 – 6 | ¾ | 83 | — | — | — | 78.5 |
| 6 – 7 | ¾ | 42 | — | — | — | 101.8 |
| 7 – 8 | 1 | 85 | — | — | — | 92.6 |

TABLE IV

The Effect of Temperature on the Coal Transfer Rate at a Constant Pressure Differential

| Run No. | ΔP Across Coil, Psi | Coal Rate Lb./Coal/Hr. | Average Coal Temperature, °C. |
|---|---|---|---|
| 1 | 128 | 2647 | 112 |
| 2 | 123 | 2016 | 108 |
| 3 | 128 | 2507 | 134 |
| 4 | 125 | 2125 | 146 |
| 5 | 126 | 2180 | 158 |
| 6 | 128 | 2530 | 156 |
| 7 | 128 | 2579 | 196 |

TABLE IV-continued

The Effect of Temperature on the Coal Transfer Rate at a Constant Pressure Differential

| Run No. | ΔP Across Coil, Psi | Coal Rate Lb./Coal/Hr. | Average Coal Temperature, °C. |
|---|---|---|---|
| 8 | 126 | 2018 | 220 |
| 9 | 128 | 2294 | 217 |
| 10 | 128 | 2503 | 200 |
| 11 | 128 | 2487 | 239 |
| 12 | 128 | 2162 | 228 |

TABLE V

Film Coefficients $$h_g = \frac{16.6 \, C_p \, (G')^{0.8}}{(D_i')^{0.2}}$$

(eq. 24, page 467, Perry, Chem. E. Handbook, 3rd Ed.)

where $G'$ = Mass velocity, lb. of gas/sec./ft.²
$C_p$ = Specific heat of gas at constant pressure, B.t.u./lb/°F.
$D_i$ = Inside diameter, inches.
$h_r{}^s$, evaluated by the technique presented on page 490, perry Chem. E. Handbook, 3rd Ed.
$h_r{}^m$, evaluated by FIG. 12, page 473, Perry, Chem. E. Handbook, 3rd Ed. using an effectiveness radiation factor of 0.44 based on calculations using coal film coefficients determined in section C. (Average gas and coal temperatures were used with an allowance of 75 °F. temperature drop across coal film and metal wall.

| Run No. | 1/U | $h_g$ | $h_r{}^s$ | $h_r{}^m$ | $h_c$ |
|---|---|---|---|---|---|
| | | | B.t.u./Hr/Ft.²/°F. | | |
| 1 | 0.1591 | 3.16 | 0.29 | 4.50 | 30.2 |
| 2 | 0.1555 | 3.21 | 0.29 | 4.50 | 32.8 |
| 3 | 0.1364 | 3.26 | 0.34 | 5.62 | 37.6 |
| 4 | 0.136 | 3.54 | 0.34 | 5.78 | 30.8 |
| 5 | 0.1274 | 3.36 | 0.36 | 6.43 | 34.6 |
| 6 | 0.1247 | 3.05 | 0.38 | 6.42 | 43 |
| 7 | 0.1116 | 3.61 | 0.41 | 7.70 | 38 |

TABLE V-continued

| | | | | | |
|---|---|---|---|---|---|
| 8 | 0.1108 | 3.90 | 0.45 | 9.31 | 26.6 |
| 9 | 0.1067 | 4.28 | 0.47 | 9.63 | 26.7 |
| 10 | 0.105 | 3.68 | 0.45 | 9.00 | 34.6 |
| 11 | 0.1003 | 3.81 | 0.47 | 9.63 | 35.4 |
| 12 | 0.094 | 4.13 | 0.45 | 9.31 | 38 |
| | | | | Average | 34.0 |

TABLE VI

| Run No. | Intermediate Temperature and Pressure Readings | | | | | | | | | | |
|---|---|---|---|---|---|---|---|---|---|---|---|
| | Temperatures, °C. | | | | | | Pressures, Psig | | | | |
| | t-2 | t-3 | t-4 | t-5 | t-6 | t-7 | p-1 | p-2 | p-3 | p-4 | p-5 |
| 1 | 79 | 101 | 127 | 137 | 156 | — | 131 | 94 | 40 | 14 | 4 |
| 2 | ** | ** | ** | 137 | 156 | — | 128 | 93 | 44 | 17 | 5 |
| 3 | 94 | 125 | 153 | 163 | 185 | * | 132 | 95 | 40 | 15 | 4 |
| 4 | — | — | — | 184 | 209 | — | 130 | 96 | 44 | 17 | 5 |
| 5 | — | — | — | 199 | 226 | — | 131 | 95 | 45 | 16 | 5 |
| 6 | 108 | 144 | 178 | 190 | 217 | — | 132 | 97 | 42 | 15 | 4 |
| 7 | 154 | 185 | 217 | 231 | 257 | — | 132 | 95 | 40 | 14 | 4 |
| 8 | — | — | — | 278 | 312 | — | 133 | 100 | 47 | 18 | 6 |
| 9 | — | — | — | 274 | 308 | — | 132 | 95 | 43 | 15 | 4 |
| 10 | 144 | 186 | 231 | 251 | 285 | — | 132 | 97 | 44 | 15 | 4 |
| 11 | 187 | 227 | 268 | 282 | 310 | — | 132 | 96 | 41 | 15 | 4 |
| 12 | 172 | 215 | 260 | 276 | 310 | 326 | 133 | 96 | 44 | 17 | 5 |

\* Thermowell No. 7 developed leak before Run No. 3 and was blocked off, except for run 12.
\*\* Removed thermowells 2, 3 and 4 for runs 2, 4, 5, 8 and 9.

TABLE VII

Experimental Data on Powdered Coal Heating

| Run No. | Coal Rate Lb./Hr. | Temperature, °C. | | | | Methane Burned Lb. Mols/Hr. | Carbon Dioxide Injected Lb. Mols/Hr. | Conveying Gas-Nitrogen Lb. Mols/Hr. | Heat To Coal Btu/hr. |
|---|---|---|---|---|---|---|---|---|---|
| | | In Gas | Out Gas | In Coal | Out Coal | | | | |
| 1 | 2647 | 563 | 227 | 38 | 185 | 3.09 | 3.54 | 2.55 | 278,200 |
| 2 | 2016 | 564 | 244 | 30 | 186 | 3.10 | 3.74 | 4.27 | 203,500 |
| 3 | 2507 | 641 | 258 | 42 | 226 | 3.62 | 3.75 | 2.55 | 267,700 |
| 4 | 2125 | 647 | 269 | 48 | 244 | 4.29 | 3.66 | 4.33 | 297,100 |
| 5 | 2180 | 728 | 286 | 48 | 267 | 4.51 | 3.54 | 4.31 | 302,900 |
| 6 | 2530 | 761 | 282 | 47 | 263 | 4.65 | 3.83 | 2.55 | 275,500 |
| 7 | 2579 | 753 | 319 | 97 | 295 | 4.7 | 3.75 | 2.55 | 333,800 |
| 8 | 2018 | 876 | 360 | 84 | 356 | 6.76 | 3.54 | 4.31 | 484,100 |
| 9 | 2294 | 842 | 352 | 91 | 343 | 6.47 | 3.54 | 4.27 | 591,700 |
| 10 | 2503 | 919 | 344 | 61 | 338 | 6.6 | 3.78 | 2.55 | 511,700 |
| 11 | 2487 | 895 | 364 | 117 | 362 | 6.78 | 3.62 | 2.55 | 497,200 |
| 12 | 2152 | 841 | 361 | 87 | 364 | 6.76 | 3.87 | 2.55 | 512,400 |

TABLE VIII

Screen Analysis and Bulk Density of Coal Used in Heating Experiments

| Tyler Mesh | Weight Per Cent Retained on Screen | |
|---|---|---|
| | A* — 100% Through 40 M | C**— 100% Through 20 M |
| 20 | 0.0 | 0.0 |
| 40 | 1.9 | 22.5 |
| 60 | 3.1 | 28.8 |
| 100 | 10.8 | 19.7 |
| 200 | 26.9 | 15.3 |
| 325 | 32.1 | 6.3 |
| −325 | 25.2 | 7.4 |
| | 100.0 | 100.0 |
| Bulk Density Coal Lb/Ft.$^3$ | 40.5 | 46.4 |

\*Coal used in Runs 1, 3, 6, 7, 10–12 — 100 per cent passed through 40 mesh.
\*\*Coal used in runs 2, 4, 5, 8 and 9 — 100 per cent passed through 20 mesh.

What is claimed is:

1. In a method of transporting coal particles in a dense phase flow through a transfer line, the improvement which comprises:
    a. providing a dense phase of coal particles by fluidizing said particles with a non-oxidizing gas;
    b. providing a transfer line which comprises at least a plurality of successively linked and serially aligned sections each having a uniform cross-sectional area separated by transition sections each having a varying cross-sectional area which is linearly enlarged a predetermined amount in cross-sectional area;
    c. introducing said dense phase into a first one of said sections of uniform cross-sectional area at a predetermined entrance velocity;
    d. causing said dense phase to leave said first section and each successive section of uniform cross-sectional area and enter the succeeding transition section linked thereto at a predetermined exit velocity, said exit velocity being greater than said entrance velocity and below the velocity at which significant erosion occurs; and
    e. causing said dense phase to leave each transition section at said entrance velocity for introduction into the next section of successively larger, uniform cross-sectional area.

2. A method as defined in claim 1 wherein in step c, said entrance velocity is between about 15 feet per second and about 50 feet per second and in step d, said exit velocity is between about 50 feet per second and about 60 feet per second.

3. A method as defined in claim 2 wherein said entrance velocity is between about 15 feet per second and about 20 feet per second.

4. A method as defined in claim 3 wherein said entrance velocity is about 20 feet per second and said exit velocity is about 60 feet per second.

5. A method as defined in claim 2 wherein in step d, said dense phase is caused to leave said first section and each successive section of uniform cross-sectional area at said exit velocity by: selecting a length for said sections of uniform cross-sectional area in accordance with the following equation:

$$\Delta P/L = 0.629 \, D^{0.5} G^{1.85}$$

wherein Δ $P/L$ is the pressure drop per foot of transfer line in psi per foot; $D$ is the inside diameter of the transfer line measured in feet and $G$ is the mass velocity measured in million pounds per hour per square foot, and passing said dense phase through each of said sections of uniform cross-sectional area.

6. A method as defined in claim 1 wherein said transfer line comprises at least a multiplicity of said sections of uniform cross-sectional area.

7. A method as defined in claim 2 further including the step
   f. indirectly heating said dense phase flowing through said transfer line to a temperature between about 250°C and about 420°C, by heating at least a portion of said transfer line for a preheat time sufficiently brief to avoid agglomeration of the coal particles.

8. A method as defined in claim 7 wherein said entrance velocity is between about 15 feet per second and about 20 feet per second.

9. A method as defined in claim 7 wherein said entrance velocity is about 20 feet per second and said exit velocity is about 60 feet per second.

10. A method as defined in claim 7 wherein said transfer line comprises at least a multiplicity of said sections of uniform cross-sectional area.

11. A transport system for a dense phase of coal particles comprising:

a. at least one transfer line, said line comprising at least a plurality of line sections adapted to convey said dense phase while increasing the velocity of said dense phase from a predetermined entrance velocity to a predetermined exit velocity at which erosion of said transfer line is significant, said line sections being serially aligned and linked together, each of said sections having a uniform cross-sectional area which is successively enlarged a predetermined amount over the previous section linked thereto, each section of uniform cross-section having a predetermined length; and
   b. at least a plurality of transition means adapted to lower said exit velocity to said entrance velocity, each of said transition means being interposed between said sections of successively larger, uniform cross-sectional area, each of said transition means having a linearly increasing cross-sectional area which is enlarged by said predetermined amount from a cross-sectional area substantially equal to the cross-sectional area of the prior section of uniform cross-sectional area linked thereto, to equal the enlarged cross-sectional area thereto.

12. An apparatus as defined in claim 11 comprising a multiplicity of said transfer lines and wherein each of said lines is comprised of a multiplicity of said line sections of uniform cross-sectional area.

* * * * *

UNITED STATES PATENT OFFICE
CERTIFICATE OF CORRECTION

Patent No. 3,963,415      Issue Date June 15, 1976

Inventor(s) Charles W. Albright

It is certified that error appears in the above-identified patent and that said Letters Patent are hereby corrected as shown below:

Column 2, line 43 after "that" and before "the" delete --has--.

Column 3, line 10 after "that" and before "a" insert --at--.

Column 3, line 57 "accordaance" should read --accordance--.

Column 3, line 58, "fluidizig" should read --fluidizing--.

Column 5, line 31 "my" should read --may--.

Column 6, line 32 "coefficeint" should read --coefficient--.

Column 6, line 32 "expresssed" should read --expressed.

Column 6, line 61 "calaculating" should read --calculating--.

Signed and Sealed this

Fifteenth Day of February 1977

[SEAL]

Attest:

RUTH C. MASON
*Attesting Officer*

C. MARSHALL DANN
*Commissioner of Patents and Trademarks*